United States Patent
Kadotani et al.

Patent Number: 5,351,884
Date of Patent: Oct. 4, 1994

[54] HEATING APPARATUS IN CABIN

[75] Inventors: Kanichi Kadotani, Atsugi; Teruyuki Matsuki; Hiroki Nakanishi, both of Hiratsuka, all of Japan

[73] Assignee: Kabushiki Kaisha Komatsu Seisakusho, Tokyo, Japan

[21] Appl. No.: 30,198

[22] PCT Filed: Sep. 20, 1991

[86] PCT. No.: PCT/JP91/01252
§ 371 Date: Mar. 24, 1993
§ 102(e) Date: Mar. 24, 1993

[87] PCT Pub. No.: WO92/05971
PCT Pub. Date: Apr. 16, 1992

[30] Foreign Application Priority Data

Sep. 27, 1990 [JP] Japan .................. 2-101438[U]

[51] Int. Cl.$^5$ ................................ B60H 1/02
[52] U.S. Cl. ................................ 237/12.3 A
[58] Field of Search ............ 237/2 A, 12.3 A, 12.3 B, 237/12.3 R, 12.3 C; 454/145

[56] References Cited

FOREIGN PATENT DOCUMENTS 52-70856  5/1977  Japan .
55-1928   1/1980  Japan .
58-28891  6/1983  Japan .
60-56623  4/1985  Japan .

*Primary Examiner*—Henry A. Bennet
*Attorney, Agent, or Firm*—Richards, Medlock & Andrews

[57] ABSTRACT

A cabin heating apparatus in accordance with the present invention is provided with a central duct (3) extended to one side of an operator's seat through a front-to-rear changeover damper (2) connected to an air conditioner unit (1), a rear duct (4) extended to the rear of the operator's seat through the front-to-rear changeover damper 2 and outlets (9) formed at an extreme end part of the rear duct (4). The cabin heating apparatus is further provided with a lower outlet (6) for supplying an air flow along a floor through an above-to-below changeover damper (5) connected to an extreme end part of the central duct (3), a front duct (7) rising from the above-to-below changeover damper 6 and a front outlet (8) provided at an extreme end part of the front duct (7). An appropriate air flow distribution ratio is set by these changeover dampers (2, 5).

20 Claims, 3 Drawing Sheets

HEATING APPARATUS IN CABIN

FIELD OF THE INVENTION

The present invention relates to a heating apparatus for use in a cabin of a construction machine or the like.

BACKGROUND OF THE INVENTION

In a cabin of a construction machine, farm machine, industrial vehicle or the like or an automobile, a blower type heating apparatus is provided to make a comfortable environmental condition for an operator or driver in winter. For example, a heating apparatus to be installed in a cabin of a construction machine is such that, as shown in FIG. 3, a heater 12 is installed on a floor behind the operator's seat 11 to introduce air from the cabin through both sides of the heater 12, to heat air in the heater 12 and to supply heated air from the front side of the heater and, as shown in FIG. 4, an air conditioner unit 1 is installed on a floor behind the operator's seat to introduce air from the cabin through an inlet 13, to heat it in the air conditioner unit 1 and to supply heated air to the front side of the operator's seat 11 through a space below the operator's seat and to the upper corner of the cabin from the rear side of the operator's seat 11.

In case of a cabin heating apparatus as shown in FIG. 3, however, heated air outlets are provided only at the front side of the heater 12, and therefore the heated air is immediately collected at the upper part of the cabin and a temperature distribution in the cabin is not likely to attain an optimum condition such as a head-cool and feet-warm environment. Also in case of an air conditioner unit as shown in FIG. 4, the environmental condition in the cabin is similar to the above and the air conditioner unit is unlikely to provide such head-cool and feet-warm condition even though the heated air is blown out upwardly from the heated air outlets behind the operator's seat 11 to promote air circulation in the cabin. Such conventional heating apparatuses as described above also have a problem that the operator or driver cannot be relieved from a feeling of coldness at the front part, particularly the parts below the knees, of his body.

An object of the present invention made in view of the above conventional problems is to provide a cabin heating apparatus capable of obtaining an optimum temperature distribution even under winter environmental conditions.

SUMMARY OF THE INVENTION

A cabin heating apparatus in accordance with the present invention is provided with a central duct extended to the side of the operator's seat through a front-to-rear changeover damper connected to an air conditioner unit, a rear duct extended to the rear of the operator's seat through the front-to-rear changeover damper and outlets formed at the extreme end part of the rear duct. The heating apparatus is further provided with a lower outlet for supplying an air flow along the floor through an above-to-below changeover damper connected to the extreme end part of the central duct, a front duct rising from the above-to-below changeover damper and a front outlet provided at the extreme end part of the front duct.

In use for heating, an air flow distribution ratio by means of the front-to-rear damper is determined to be 'front:rear'=0.95~0.85:0.05~0.15 and that by means of the above-to-below damper to be 'above:below'=0.25~0.35:0.75~0.65. The air flow distribution ratios by means of these front-to-rear damper and above-to-below damper are variable within the ranges shown above or can be fixed to specific values within the above ranges.

According to the construction as described above, the heated air flow supplied from the air conditioner unit is divided into optimum air flow ratios through two changeover dampers and therefore an air flow supplied to the feet of the operator is approximately 63% of the overall heated air flow. When an air flow supplied downwardly from the front outlet is added to the above air flow, as much as approximately 90% of the overall heated air flow forms an air flow which can surround the feet of the operator. The operator's feet and the cabin floor are continuously heated by such heated air flow and therefore the temperature distribution in the cabin can be maintained at an ideal level which allows the head-cool and feet-warm environment.

BEST FORM OF EMBODIMENT OF THE INVENTION

Figure 1:
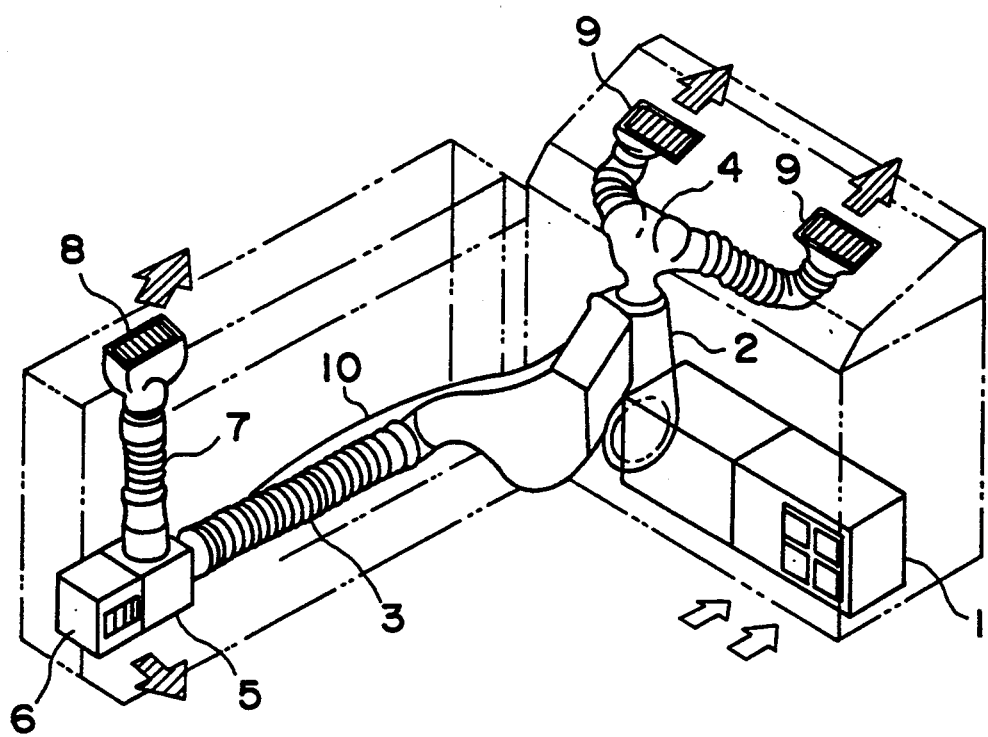
FIG. 1 is an illustration showing a layout of changeover dampers, ducts and heated air outlets of a cabin heating apparatus in accordance with the present invention.

An embodiment of a cabin heating apparatus in accordance with the present invention is described in detail, referring to the accompanying drawings:

In FIG. 1, an air conditioner 1 is installed on the floor behind the operator's seat and a front-to-rear changeover damper 2 is connected to this air conditioner 1. A central duct 3 and a rear duct 4 are connected to the outlet of the front-to-rear changeover damper 2 and the central duct 3 is connected to an above-to-below changeover damper 5 installed on the floor at the front right side of the operator's seat through the right underside of the operator's seat. A lower outlet 6 is connected to the front part of this above-to-below changeover damper 5, and a front outlet 8 is connected to the upper end of a front duct 7 which rises vertically from the above-to-below changeover damper 5.

The rear duct 4 connected to the outlet of the front-to-rear changeover damper 2 is branched at its halfway position and the branched ducts are respectively connected to two rear outlets 9, 9 provided behind the operator's seat. The air flow direction of the lower outlet 6, the front outlet 8, and the rear outlets 9, 9 can be changed.

For a cabin heating apparatus which is constructed as described above, an air flow distribution ratio by means of the front-to-rear changeover damper 2 is set to 'front:rear'=0.95~0.85:0.05~0.15 and the air flow distribution ratio by means of the above-to-below changeover damper 5 is set to 'above:below'=0

25~0.35:0.75~0.65. In other words, the air flow slantly supplied from the lower outlet 6 toward the operator's feet is approximately 63% which accounts for the greater part of the overall air flow. In addition, the heated air is blown to the operator's lower extremities from his knees to his feet by facing the front outlet 8 downwardly and accordingly approximately 90% of the overall air flow is supplied to the operator's lower extremities.

The air flow distribution ratio can be varied or adjusted within the above described ranges or can be fixed to specific values and not be adjusted. The air flow distribution ratio is varied by increasing or decreasing the passage areas of the front-to-rear changeover damper 2 and the above-to-below changeover damper 5 through a wire cable 10 which is actuated by the operator with an air flow adjust lever which is not shown.

Figure 2:
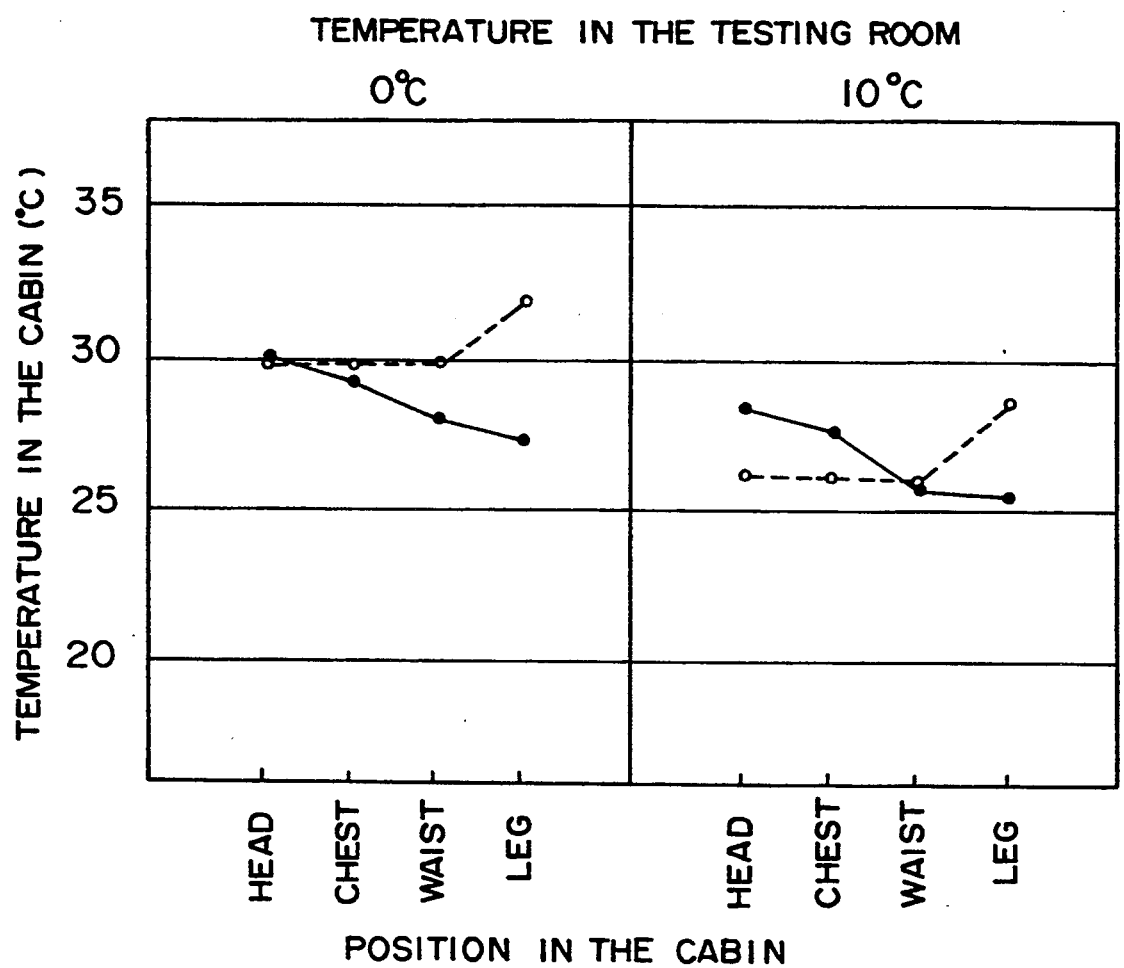
FIG. 2 is a comparative graph showing a temperature distribution in a cabin with the inventive embodiment of FIG. 1 (broken line) versus a temperature distribution in the cabin with the conventional system of FIG. 3 (solid line)
Figure 3:
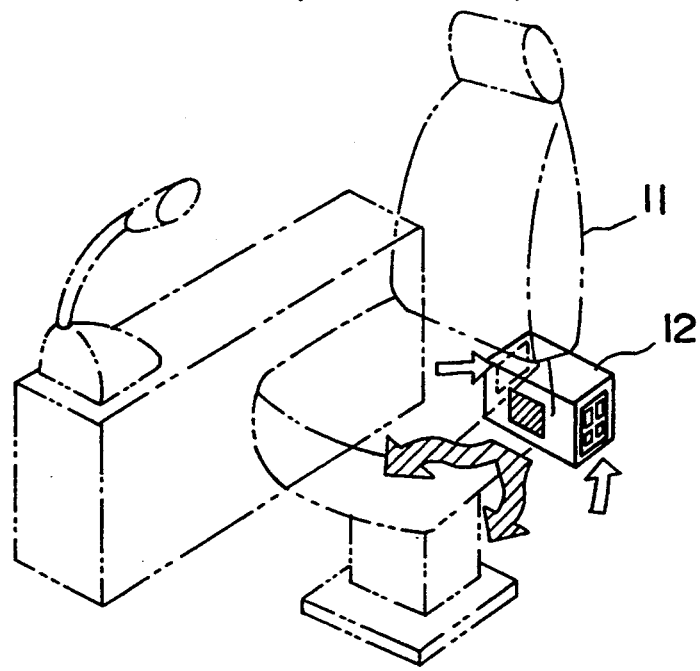
FIG. 3 is an illustration of a cabin heating apparatus in which a conventional heater is installed.
Figure 4:
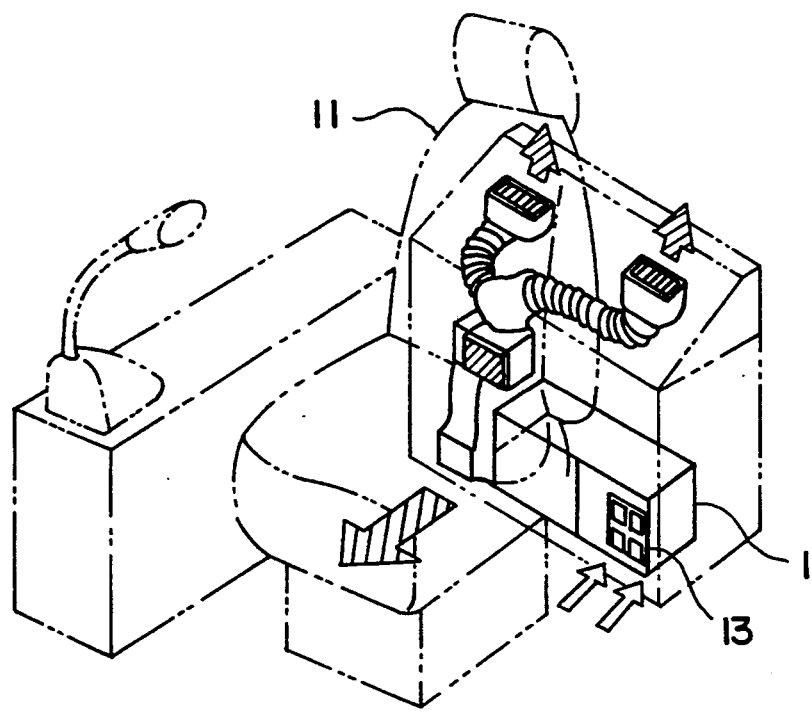
FIG. 4 is an illustration of a cabin heating apparatus in which a conventional air conditioner is installed.

FIG. 2 is a comparative graph showing the temperature distribution in the cabin with the cabin heating apparatus in accordance with this embodiment and with a conventional cabin heating apparatus. The temperature in the cabin was measured at four positions, that is, at the head, chest, waist and feet of an operator who stayed in a cabin installed in a testing room. As a result of measurement at temperatures in the testing room which are set at 0° C. and 10° C. as two standard temperature levels, a local temperature with the heater shown in FIG. 3 (solid line) is highest at the operator's head with respect to both temperature levels and lowest at his feet. On the contrary, in case of this embodiment (broken line), the local temperature is highest at the feet and equal at his other three parts with an ideal temperature distribution which allows the head-cool and feet-warm environment. From the results of measurements, it is known that, though the local temperature in the cabin exceeds 25° C., a comfortable temperature can be maintained in the cabin by appropriately adjusting the air conditioner.

INDUSTRIAL APPLICABILITY

The present invention provides a cabin heating apparatus, useful for construction machines and other vehicles, which is capable of ensuring an ideal temperature distribution which allows a head-cool and feet-warm environment in the cabin, contributing to improvement of operation efficiency in a comfortable working environment. The heating apparatus can also apply to a small room or space such as a reading room, personal computer room, etc. In addition, the apparatus can be used as an air conditioner by appropriately setting the air flow distribution ratio for front-to-rear and above-to-below directions.

We claim:

1. A cabin heating apparatus provided with a central duct having a front end part extended to one side of an operator's seat, said central duct being connected through a front-to-rear changeover damper to an air conditioner unit, a rear duct having an extreme end part extended to the rear of the operator's seat, said rear duct being connected through the front-to-rear changeover damper to said air conditioner unit, and outlets formed at said extreme end part of the rear duct, and further provided with a lower outlet for supplying an air flow along a floor through an above-to-below changeover damper connected to the front end part of the central duct, a front duct having an upper end part and rising from the above-to-below changeover damper, and a front outlet provided at said upper end part of the front duct, whereby the front-to-rear changeover damper divides air flow supplied from the air conditioner unit into a flow through said central duct and a flow through said rear duct, and the above-to-below changeover damper divides air flow from said central duct into a flow through said front outlet and a flow through said lower outlet.

2. A cabin heating apparatus provided with a central duct having a front end part extended to one side of an operator's seat, said central duct being connected through a front-to-rear changeover damper to an air conditioner unit, a rear duct having an extreme end part extended to the rear of the operator's seat, said rear duct being connected through the front-to-rear changeover damper to said air conditioner unit, and outlets formed at said extreme end part of the rear duct, and further provided with a lower outlet for supplying an air flow along a floor through an above-to-below changeover damper connected to said front end part of the central duct, a front duct having an upper end part and rising from the above-to-below changeover damper, and a front outlet provided at an extreme end part of the front duct, wherein, for use in heating, an air flow distribution ratio by means of said front-to-rear changeover damper is determined to be 'front:rear'=0.95~0.85:0.05~0.15 and an air flow distribution ratio by means of said above-to-below changeover damper is determined to be 'above:below'=0.25~0.35:0.75~0.65.

3. A cabin heating apparatus in accordance with claim 2, wherein the air flow distribution ratio by means of said front-to-rear changeover damper and the air flow distribution ratio by said above-to-below changeover damper are variable within the above described ranges.

4. A cabin heating apparatus in accordance with claim 2, wherein the air flow distribution ratio by means of said front-to-rear changeover damper and the air flow distribution ratio by said above-to-below changeover damper are fixed to specific values within the above described ranges.

5. Apparatus for heating a cabin containing an operator's seat and a cabin floor, said apparatus comprising:
   a heater having at least one air inlet and a heated air outlet;
   a front-to-rear changeover damper connected to the heated air outlet of said heater and having an outlet;
   a rear duct connected to the outlet of said front-to-rear changeover damper and having an end part extending to the rear of the operator's seat, with the end part of the rear duct having at least one outlet opening;
   an above-to-below changeover damper positioned at one side of the operator's seat and having a lower outlet for supplying an air flow along the cabin floor;
   a central duct extending along one side of the operator's seat and connected from the outlet of said front-to-rear changeover damper to said above-to-below changeover damper;
   a front duct connected to and extending upwardly from said above-to-below changeover damper and having an end part with a front outlet opening,
   whereby the front-to-rear changeover damper divides air flow supplied from the heated air outlet into a flow through the central duct and a flow through the rear duct, and the above-to-below changeover damper divides air flow from the central duct into a flow through the front outlet opening and a flow through the lower outlet.

6. Apparatus in accordance with claim 5, wherein said heater is installed on the cabin floor behind the operator's seat.

7. Apparatus in accordance with claim 5, wherein said above-to-below changeover damper is installed at the front right side of the operator's seat.

8. Apparatus in accordance with claim 5, wherein said rear duct has at least two branches, with each branch having an outlet opening positioned behind the operator's seat.

9. Apparatus in accordance with claim 5, wherein said lower outlet is positioned to direct air flow towards the operator's feet.

10. Apparatus in accordance with claim 5, wherein said front outlet opening is positioned to direct air flow toward the operator's lower extremities.

11. Apparatus in accordance with claim 5, wherein the ratio of the air flow from said front-to-rear changeover damper through said central duct to the air flow from said front-to-rear changeover damper through said rear duct is in the range of 0.95:0.05 to 0.85:0.15.

12. Apparatus for heating a cabin containing an operator's seat and a cabin floor, said apparatus comprising:
    a heater having at least one air inlet and a heated air outlet;
    a front-to-rear changeover damper connected to the heated air outlet of said heater and having an outlet;
    a rear duct connected to the outlet of said front-to-rear changeover damper and having an end part extending to the rear of the operator's seat, with the end part of the rear duct having at least one outlet opening;
    an above-to-below changeover damper positioned at one side of the operator's seat and having a lower outlet for supplying an air flow along the cabin floor;
    a central duct extending along one side of the operator's seat and connected from the outlet of said front-to-rear changeover damper to said above-to-below changeover damper;
    a front duct connected to and extending upwardly from said above-to-below changeover damper and having an end part with a front outlet opening,
    wherein the ratio of the air flow from said above-to-below changeover damper through said front duct to the air flow from said above-to-below changeover damper through said lower opening is in the range of 0.25:0.75 to 0.35:0.65.

13. Apparatus in accordance with claim 12, wherein the ratio of the air flow from said front-to-rear changeover damper through said central duct to the air flow from said front-to-rear changeover damper through said rear duct is in the range of 0.95:0.05 to 0.85:0.15.

14. Apparatus in accordance with claim 13, wherein said heater is installed on the cabin floor behind the operator's seat.

15. Apparatus in accordance with claim 14, wherein said above-to-below changeover damper is installed at the front right side of the operator's seat.

16. Apparatus in accordance with claim 15, wherein said rear duct has at least two branches, with each branch having an outlet opening positioned behind the operator's seat.

17. Apparatus in accordance with claim 16, wherein said lower outlet is positioned to direct air flow towards the operator's feet.

18. Apparatus in accordance with claim 17, wherein said front outlet opening is positioned to direct air flow toward the operator's lower extremities.

19. Apparatus in accordance with claim 18, further comprising means for varying the ratio of the air flow from said front-to-rear changeover damper through said central duct to the air flow from said front-to-rear changeover damper through said rear duct.

20. Apparatus in accordance with claim 19, further comprising means for varying the ratio of the air flow from said above-to-below changeover damper through said front duct to the air flow from said above-to-below changeover damper through said lower opening.

* * * * *